United States Patent [19]

Poisner

[11] Patent Number: 5,708,815

[45] Date of Patent: Jan. 13, 1998

[54] DMA EMULATION VIA INTERRUPT MUXING

[75] Inventor: David I. Poisner, Folsom, Calif.

[73] Assignee: Intel Corporation, Santa Clara, Calif.

[21] Appl. No.: 437,091

[22] Filed: May 5, 1995

[51] Int. Cl.[6] .............................. G06F 9/46; G06F 13/14
[52] U.S. Cl. ............... 395/736; 395/733; 395/741; 395/842; 395/848; 395/835; 395/836; 395/681; 395/527; 395/822; 395/282
[58] Field of Search ........................... 395/733, 734, 395/735, 736, 739, 740, 741, 842, 843, 836, 800, 500, 681, 846, 848, 831, 834, 527

[56] References Cited

U.S. PATENT DOCUMENTS

| | | | |
|---|---|---|---|
| 4,868,742 | 9/1989 | Gant et al. | 395/800 |
| 5,414,815 | 5/1995 | Schwede | 395/836 |
| 5,437,042 | 7/1995 | Culley et al. | 395/800 |
| 5,475,854 | 12/1995 | Thosem et al. | 395/800 |
| 5,481,678 | 1/1996 | Kondo et al. | 395/842 |
| 5,487,154 | 1/1996 | Gunji | 395/842 |
| 5,497,501 | 3/1996 | Kohzono et al. | 395/849 |
| 5,517,624 | 5/1996 | Landry et al. | 395/287 |
| 5,537,646 | 7/1996 | Buck et al. | 395/500 |
| 5,555,413 | 9/1996 | Lohman et al. | 395/733 |
| 5,613,162 | 3/1997 | Kabenjian | 395/842 |

*Primary Examiner*—Jack B. Harvey
*Assistant Examiner*—Raymond N. Phan
*Attorney, Agent, or Firm*—Blakely, Sokoloff, Taylor & Zafman

[57] ABSTRACT

An apparatus and method for coordinating DMA between memory and a peripheral on a bus which does not support DMA comprises DMA emulation circuitry in the peripheral which allows the internal modules of the peripheral to share a single shared interrupt output line. An emulation device driver assists the microprocessor in determining the cause of interrupt signals received by the shared interrupt output line and how to service the interrupt.

19 Claims, 5 Drawing Sheets

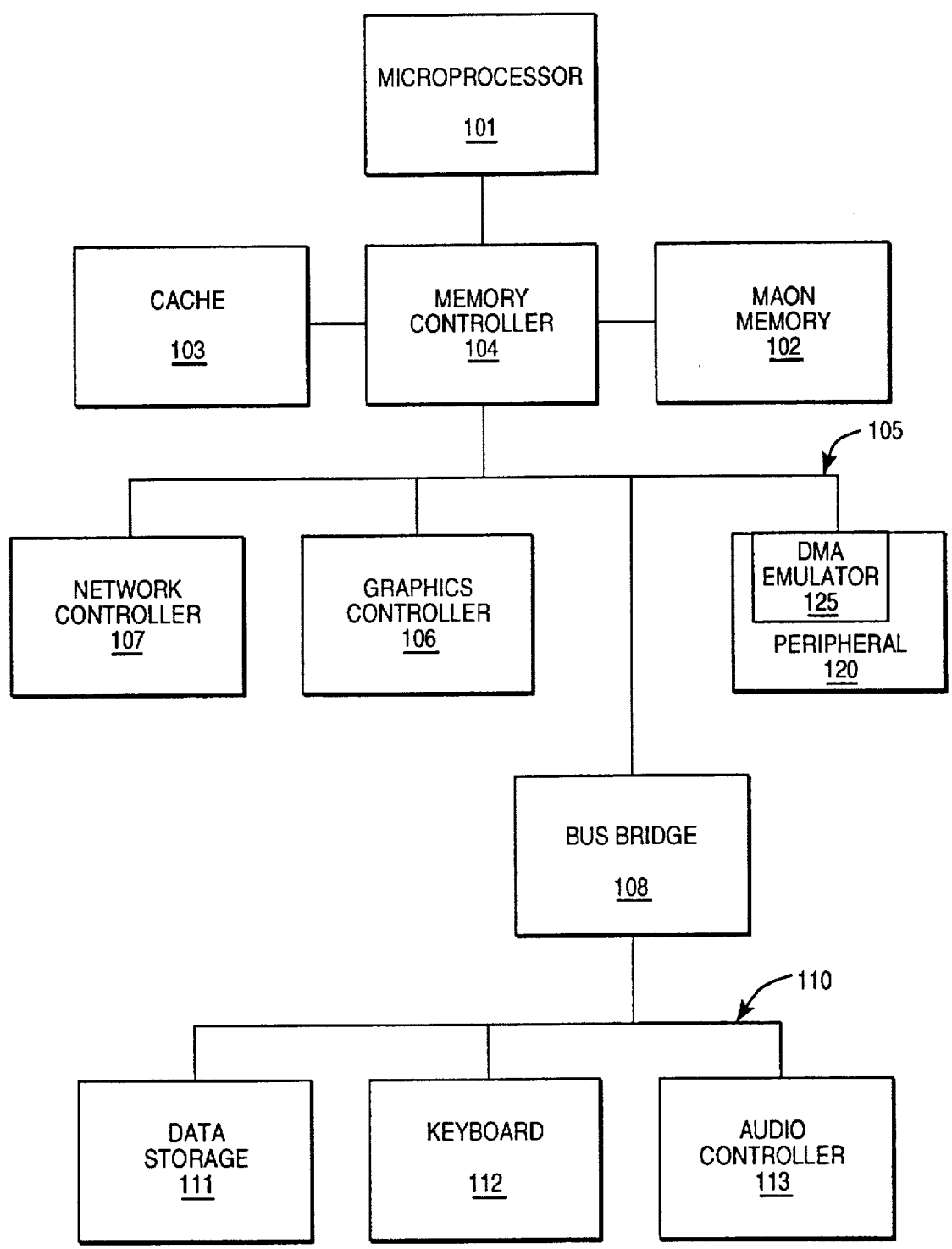
FIG_1

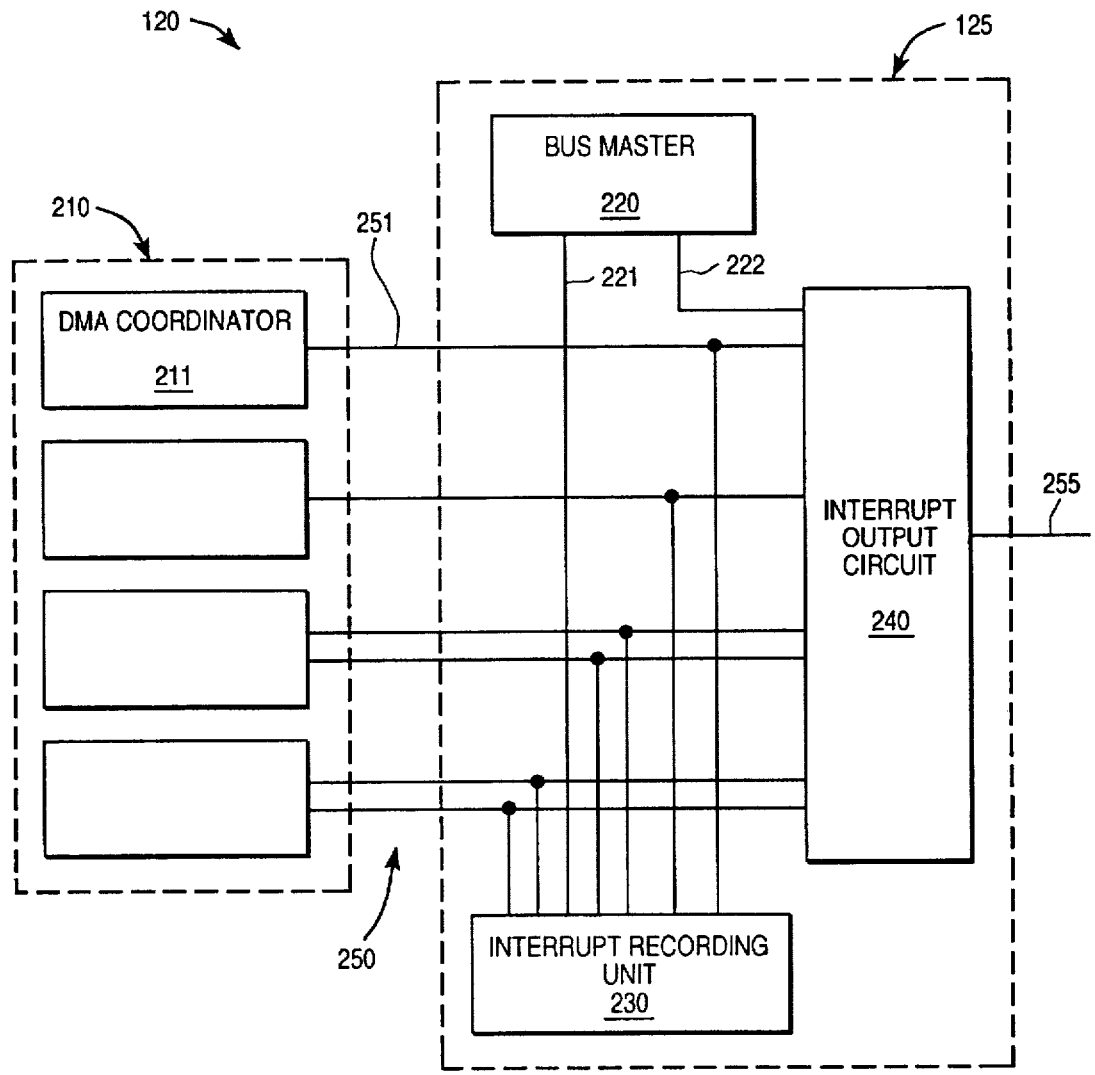
FIG_2

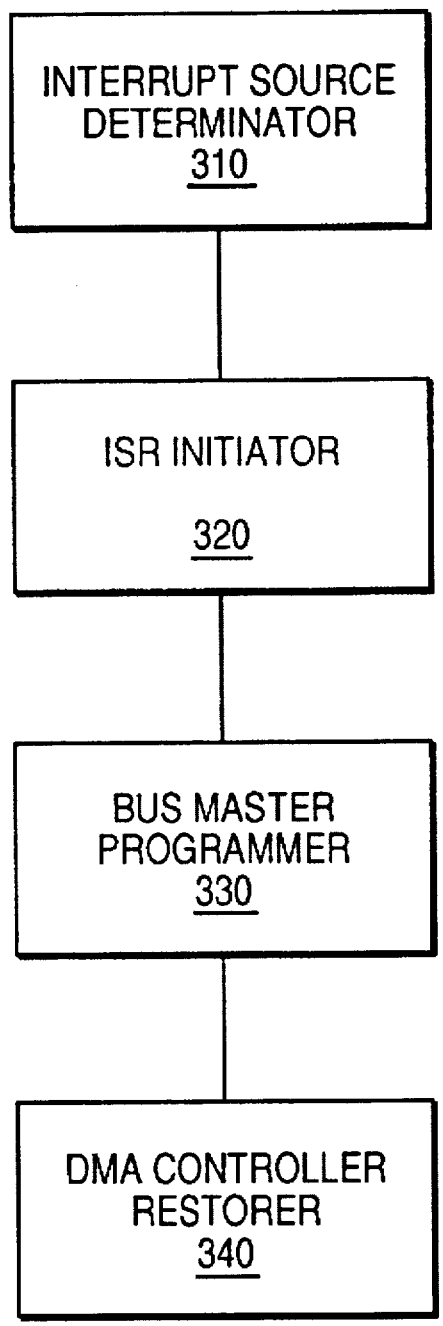
FIG_3

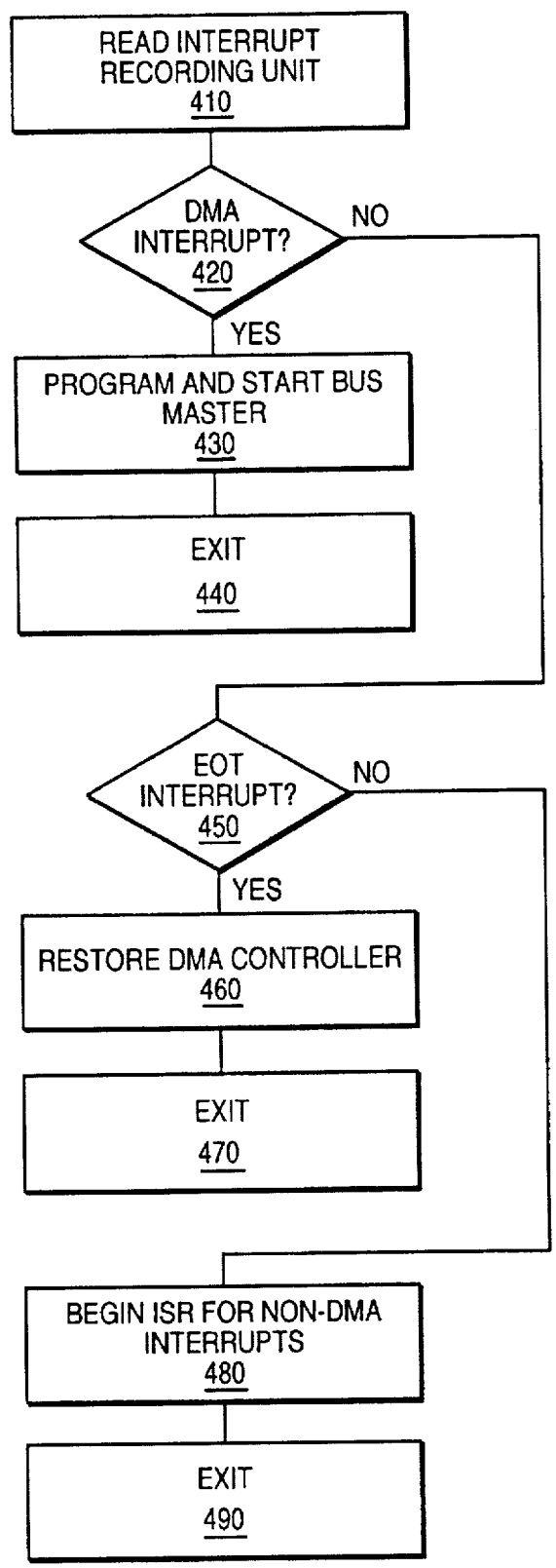
FIG_4

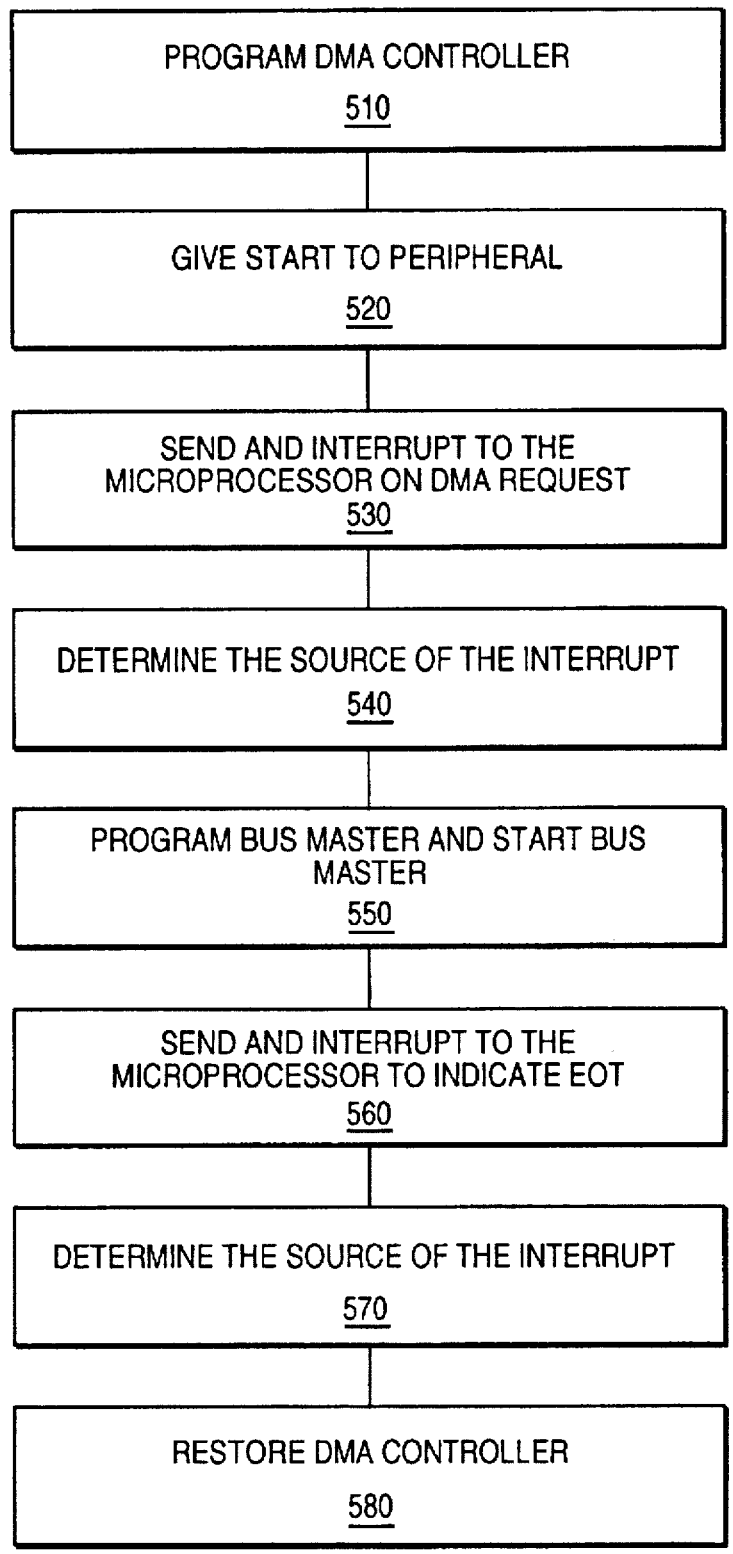
FIG_5

DMA EMULATION VIA INTERRUPT MUXING

FIELD OF THE INVENTION

The present invention relates to the field of data transfer in a computer system. More specifically, the present invention relates to an apparatus and method for providing direct memory access (DMA) to a peripheral on a bus operating in accordance with a standard that does not support DMA.

BACKGROUND OF THE INVENTION

Buses are generally classified as central processing unit (CPU) local buses or input/output (I/O) buses. Local buses are typically short in length, capable of transferring data at high speeds, and matched to the memory system to maximize memory-CPU bandwidth. Usually, the designer of a local bus is familiar with the types of devices that are to be connected to the bus and is able to design an efficient bus able to meet the needs of the devices. I/O buses, on the other hand, are often lengthy and may have many different types of devices connected to them. I/O buses also generally have a wide range in the data bandwidth of the devices connected to them.

I/O bus designs follow a bus standard because the number and variety of I/O devices are normally not fixed on a computer system. This permits users to add additional I/O devices to their system. As the interface to which these devices are connected, the I/O bus can be considered an expansion bus for adding I/O devices over time. Standards that let the computer designer and I/O device designer work independently, therefore, play a large role in determining the particular bus that is implemented. If both the computer-system designer and the I/O device designer meet the requirements, any I/O device can connect to any computer.

In recent decades, the Industry Standard Architecture (ISA) bus structure has become popular. The ISA bus structure has been implemented by many I/O device designers and supports a large share of peripheral devices. Many software applications, therefore, have been written for ISA based peripherals. However, because many new applications now require higher data throughput rates, the current trend for system designers is to move peripherals off of the ISA bus onto higher speed buses. The ISA bus structure is limited to transferring data at 8 MB/sec while higher speed buses such as the Peripheral Component Interconnect (PCI) bus standard allows data transfer rates of up to 120 MB/sec.

The problem with moving peripherals off of the ISA bus onto higher speed buses is that many of these higher speed buses use a bus standard that does not support DMA. The PCI bus standard, for example, does not support DMA request or DMA acknowledge control lines. Thus, it is impossible to use software written for peripherals which perform DMA on the ISA bus when the peripheral is moved onto the PCI bus. The user is left with two alternatives. The user could either leave a peripheral on the ISA bus specifically for running ISA written software or have the software rewritten to accommodate the PCI bus by utilizing transfer methods such as bus mastering or programmed I/O.

Thus, what is needed is a peripheral which can run DMA software written specifically for peripherals on an ISA bus when the peripheral is on a bus which does not support DMA. The present invention overcomes the drawback of the prior art by providing an apparatus and method for DMA emulation through interrupt sharing.

SUMMARY OF THE INVENTION

The present invention relates to an apparatus and method for coordinating DMA between memory and a peripheral on a bus which does not support DMA.

A DMA emulation circuitry is implemented in the peripheral. The DMA emulation circuitry allows the internal modules of the peripheral to share a single interrupt output line. One embodiment of the emulation circuitry comprises an interrupt recording unit, an interrupt output circuit, and a bus master. The interrupt output lines of the internal modules of the peripheral are coupled to the internal output circuit. When an interrupt signal is generated by one of the internal modules, the internal output circuit sends a standard interrupt signal on the shared interrupt output line. An interrupt recording unit is coupled to each of the interrupt output lines and records the source and cause of each of the interrupt signals. A bus master is coupled to both the interrupt output circuit and interrupt recording unit. The bus master stores information regarding the location of DMA data transfers and generates an interrupt signal when data transfer is complete.

An emulation device driver is implemented to help the microprocessor determine the cause of interrupt signals received by the shared interrupt output line and service the interrupt. The emulation device driver comprises an interrupt source determinator, a interrupt service routine initiator, a bus master programmer, and a DMA controller restorer.

The method of the present invention includes the steps of programming a DMA controller with address and length information of buffers in memory to be accessed. After the DMA controller is programmed, a start signal is given to the peripheral. Following the start signal, a DMA request signal is asserted by the peripheral. After the microprocessor receives the interrupt signal, it programs the bus master and starts the bus master which conducts DMA. When data transfer is completed, the bus master sends an end of transfer interrupt signal to the microprocessor. After receiving the interrupt signal, the microprocessor restores the DMA controller.

BRIEF DESCRIPTION OF THE DRAWINGS

The present invention will be understood more fully from the detailed description given below and the accompanied drawings of various features and elements embodied in the invention. The description and drawings are not meant to limit the invention to any specific embodiment. They are provided for explanation and understanding.

FIG. 1 illustrates a computer system configured in accordance with one embodiment of the present invention.

FIG. 2 illustrates a block diagram of a peripheral configured with the DMA emulator circuitry of one embodiment of the present invention.

FIG. 3 illustrates one embodiment of the modified interrupt service routine implemented in hardware.

FIG. 4 illustrates a flow diagram of one embodiment of the modified service routine.

FIG. 5 illustrates a flow diagram of a method for DMA emulation for a device on a bus that does not support DMA.

DETAILED DESCRIPTION

A method and apparatus for allowing a peripheral on a bus that does not support DMA slaves to emulate a peripheral on a bus that does support DMA slaves is disclosed. In the following description, numerous specific details are set forth to provide a thorough understanding of the present invention. However, it will be understood by those skilled in the art that the present invention may be practiced without these specific details. In other instances, well-known methods, procedures, components, and circuits have not been described in detail so as not to obscure the present invention.

FIG. 1 illustrates a computer system configured with the present invention. The computer system comprises a microprocessor 101 for processing digital data. Main memory 102 is comprised of random access memory (RAM) or some other dynamic storage device which is used to store temporary variables or other intermediate information during execution of instructions by microprocessor 101. Cache memory 103 is comprised of storage space for holding frequently accessed instructions and data obtained from main memory 102 by the microprocessor 101. Cache memory 103 is used for reducing access time. Microprocessor 101, main memory 102, and cache memory 103 are coupled to memory controller 104. Memory controller 104 directs data traffic between the microprocessor 101, main memory 102, and cache memory 103, and bridges signals from these components to high speed I/O bus 105.

High speed I/O bus 105 supports peripherals operating at high data throughput rates. High speed I/O bus 105 may utilize one of several bus standards such as PCI or VL. Graphics controller 106 and network controller 107 are coupled to high speed I/O bus 105. Graphics controller 106 coordinates and controls the graphical output to a display terminal. Network controller 107 links a network of computers together and provides communication among the machines. Both the graphics controller 106 and network controller 107 have high data transfer requirements.

I/O bus 110 is used for communicating information between peripheral devices which operate at lower throughput rates. I/O bus 110 may utilize one of several bus standards such as ISA for example. A data storage device 111 such as a hard, floppy, or optical disk drive is coupled to bus 110 for storing information and instruction. An alphanumeric input device 112, including alphanumeric and other keys, is coupled to bus 110 for communicating information to the microprocessor 101. Audio controller 113 for coordinating the recording and playing of sounds is also coupled to I/O bus. Bus bridge 108 has a translator which allows it to bridge signals between I/O bus 110 and high speed I/O bus 105.

In one embodiment of the present invention, peripheral 120 is an I/O device utilizing the present invention. Peripheral 120 is coupled to high speed I/O bus 105 which does not support DMA. Peripheral 120 may be any one of several types of I/O devices which utilizes DMA. Peripheral 120 may be, for example, a data storage device or an audio controller. Peripheral 120 comprises DMA emulation circuitry 125. DMA emulation circuitry 125 allows peripheral 120 to emulate a device on a bus that supports DMA slaves.

FIG. 2 illustrates a peripheral implementing the DMA emulation circuitry in one embodiment of the present invention. Peripheral 120 comprises internal modules 210 and DMA emulation circuitry 125. Internal modules 210 are coupled to DMA emulation circuitry through interrupt lines 250. Internal modules 210 coordinate various peripheral tasks. For example, internal module 211 is a DMA coordinator for peripheral 120. DMA coordinator module 211 produces DMA request signals when the peripheral wishes to perform DMA. DMA coordinator module 211 also responds to I/O read and I/O write signals by supplying or accepting data.

DMA emulation circuitry comprises bus master 220, interrupt recording unit 230, and interrupt output circuit 240. Interrupt lines 250 couple internal modules 210 to interrupt output circuit 240 and transfer interrupt signals from internal modules 210 to interrupt output circuit 240. An interrupt signal is generated from one of the internal modules 210 whenever a module requires microprocessor intervention. For example, DMA coordinator module 211 generates a DMA request signal on interrupt signal line 251 when peripheral 120 wishes to perform DMA. Upon receiving the DMA request interrupt, the microprocessor initiates a sequence of steps to provide the peripheral 120 with the address information of buffers to access during DMA. Other interrupt signals may be initiated by other internal modules 210 such as serial bus, keyboard, mouse real-time clock, MIDI or audio interrupts for example.

Bus master 220 is coupled to interrupt output circuit 240 and interrupt recording unit 230. Bus master 220 contains field registers for storing memory addresses of buffers which are to be accessed during DMA and length values of these buffers. This information is used by the bus master to coordinate DMA with specific locations in memory. When the length field of a buffer goes to zero, the bus master 220 sends an interrupt signal on line 222 indicating the end of transfer to the microprocessor. Bus master also sends a signal on line 221 to interrupt recording unit 230. Bus master 220 may be one of many types of address generating circuitry.

In one embodiment of the present invention, bus master 220 is programmed with address information by microprocessor 101 and coordinates DMA with DMA coordinator module 211. In another embodiment of the present invention, bus master 220 is not used by DMA emulation circuitry 125. Instead, DMA emulation circuitry 125 utilizes slave registers that are I/O mapped or memory mapped. The microprocessor moves data between the peripheral's slave registers and main memory without utilizing a bus master in the peripheral.

Interrupt recording unit 230 is coupled to internal modules 210 and bus master 220 through output lines 250 and 221. In one embodiment of the present invention, interrupt recording unit 230 monitors output lines 250 and records the sources of interrupts read off of the lines. In another embodiment of the present invention, interrupt recording unit 230 determines the exact cause of the interrupt by determining the sub-module that generated the interrupt. The interrupt recording unit 230 may be one of a variety of recording units. In the preferred embodiment of the present invention, interrupt recording unit 230 is an I/O mapped register. The I/O mapped register uses either an 8-bit or 16 bit field depending on the number or interrupts to be supported.

Interrupt output circuit 240 is coupled to internal modules 210 and bus master 220. Interrupt output circuit 240 outputs a signal on a shared interrupt output line 255 whenever an interrupt signal is sent on any one of the plurality of output lines 250 and 222. In one embodiment of the present invention, interrupt output circuit 240 is an OR gate.

Typically, interrupt output lines in a standard ISA peripheral have their own separate peripheral outputs. The non-DMA related peripheral outputs are normally routed to the microprocessor. Upon receiving an interrupt signal from one of the non-DMA peripheral outputs, the microprocessor uses a vector table to find the location of an appropriate service routine associated with the specific interrupt output. The microprocessor then runs the appropriate service routine to service the internal module which requested service. DMA related request signals are routed separately to a DMA controller. These signals prompt the DMA controller to initiate DMA data transfers.

The interrupt sharing scheme implemented by the DMA emulation circuitry 125 of the present invention routes all the interrupt and DMA request output lines 250 of the internal modules 210 to a single shared interrupt output line 255 for the peripheral 120. This allows the peripheral 120 to share interrupt signals on a bus utilizing a bus standard which requires sharing interrupt lines. The signal on the shared interrupt output line 255 and the information regarding the source and cause of the signal in interrupt recording unit 230 are further processed by an emulation device driver. The emulation device driver initiates the appropriate required services.

FIG. 3 illustrates a block diagram of one embodiment of an emulation device driver of the present invention. Emulation device driver 300 is run by the microprocessor in processing standard interrupt signals from a peripheral utilizing the present invention. For example, emulation device driver 300 intercepts the standard interrupt signal from shared interrupt output line 255 and determines the cause of the interrupt. If the standard interrupt is caused by an internal module other than the DMA coordinator module 211, an existing interrupt service routine is called from main memory 102. If the standard interrupt is caused by a DMA emulation mode, then the emulation device driver 300 directs the microprocessor as to how to service the interrupt. Emulation device driver comprises interrupt source determinator 310, interrupt service routine initiator 320, bus master programmer 330, and DMA controller restorer 340. Interrupt source determinator 310 is coupled to interrupt service routine initiator 320. Interrupt service routine initiator is coupled to bus master programmer 330. Bus master programmer is coupled to DMA controller restorer 340.

Interrupt source determinator 310 determines the source of the signal sent to the microprocessor from shared interrupt output line 255 by reading interrupt recording unit 230. By reading the interrupt recording unit 230, interrupt source determinator 310 determines whether the interrupt sent to the microprocessor is a DMA request interrupt from a DMA coordinator module, an end of transmission interrupt from an bus master 220 or an interrupt from one of the other internal modules in the peripheral. If interrupt source determinator 310 determines that the interrupt signal was initiated by an internal module other than the DMA coordinator module 211, internal service routine initiator 320 prompts the microprocessor to initiate an internal service routine in main memory to service the hardware which initiated the interrupt.

When interrupt source determinator 310 determines that the signal was initiated by the DMA coordinator module 211, bus master programmer 330 reads the DMA controller to determine what data should be moved. The bus master programmer 330 reads the starting location and length of buffers in memory which are to be accessed by the peripheral as well as the direction of the transfer from registers in a DMA controller. The emulation device driver 300 moves the data instead of the DMA controller. This is achieved either through programmed I/O cycles or by causing the peripheral to become a bus master to move the data. In the embodiment of the present invention where emulation device driver 300 causes the peripheral to become a bus master, bus master programmer 330 programs relevant buffer addresses and length values into bus master 220. In another embodiment of the present invention, bus master obtains addresses and length values of buffers to be accessed without a bus master programmer 330. In this embodiment of the present invention, bus master 220 monitors write cycles to I/O addresses of registers in a DMA controller. By monitoring the write cycles to these registers, bus master 220 obtains information pertaining to the address, length, and direction for each DMA channel.

When interrupt source determinator 310 determines that the interrupt signal is an end of transmission signal initiated by a bus master, DMA controller restorer updates the DMA controller so that the DMA appears to have been completed normally. DMA controller restorer typically updates a length field counter in the DMA controller to indicate that DMA data transfer was completed. Emulation device driver 300 then calls the interrupt service routine.

Interrupt source determinator 310, interrupt service routine initiator 320, bus master programmer 330, and DMA controller restorer 340 can be implemented either as hardware or as software, as stored in main memory 102 and executed by microprocessor 101. In the preferred embodiment of the present invention, emulation device driver 300 is a set of instructions implemented with the interrupt service routine stored in the operating system of microprocessor 101.

FIG. 4 is a flow chart illustrating the steps taken by one embodiment of an emulation device driver as implemented as software. First, the emulation device driver reads an interrupt recording unit of a peripheral to determine the source of the interrupt. This is illustrated in block 410. Next, the emulation device decides whether the interrupt is a DMA request interrupt, as shown in block 420. If the interrupt is not a DMA request interrupt from a DMA coordinator module, the emulation device driver proceeds to the step illustrated in block 450. If the interrupt is a data request interrupt from a DMA coordinator module, the emulation device driver instructs the microprocessor to program a bus master in the peripheral. Programming is typically achieved by instructing the microprocessor to read address, length, and direction registers in a DMA controller and to program these values into registers in the bus master. After programming is completed, the microprocessor is instructed to start the bus master. This is illustrated in block 430. Next, the emulation device driver exits the present routine, as shown in block 440.

Block 450 illustrates the step where the emulation device driver determines whether the interrupt signal is an end-of-transfer interrupt from a bus master. If the interrupt signal is not an end of transfer interrupt from a bus master, the emulation device driver proceeds to the step illustrated in block 480. If the interrupt signal is an end of transfer interrupt from a bus master, the microprocessor is instructed to restore the DMA controller. The microprocessor restores the DMA controller by updating a length field counter to indicate that data transfer had taken place. This is illustrated in block 460. Next, the emulation device driver exits the present routine, as shown in block 470.

Block 480 illustrates the step where the emulation device driver instructs the microprocessor to run an interrupt service routine stored in main memory. The interrupt service routine services the non-DMA hardware in the peripheral which initiated the interrupt signal. Next, the emulation device driver exits the present routine, as shown in block 490.

FIG. 5 is a flow diagram illustrating a method for conducting DMA data transfers according to one embodiment of the present invention. First, the microprocessor programs DMA controller with start address, length, and direction information of buffers in memory which will participate in data transfer. This is shown in block 510. Next, the microprocessor gives a start signal to the peripheral indicating that a DMA request may be given. This is shown in block 520. The peripheral generates a DMA request signal when it wishes to perform a DMA data transfer. In the past, the DMA request was made to a DMA controller to access the bus via a special bus request line. In this embodiment of the present invention, the DMA request signal is sent to the microprocessor via a shared interrupt output line, as shown in block 530. Upon receiving the interrupt signal from a shared interrupt output line, the microprocessor determines the source of the interrupt signal, as shown in block 540. Determining that the cause of the interrupt signal was a DMA request from the peripheral, the microprocessor programs a bus master in the peripheral with address, length, and direction information of buffers to be accessed by the peripheral. This is achieved by first reading registers in the DMA controller and writing this information in registers in the bus master. After programming is completed, the microprocessor instructs the bus master to begin DMA. This is shown in block 550.

After DMA is completed, the bus master sends an interrupt signal to the microprocessor to indicate the end of transfer, as shown in block 560. Upon receiving the interrupt signal from the shared interrupt output line, the microprocessor determines the source of the interrupt signal, as shown in block 570. Determining that the cause of the interrupt signal was an end of transfer signal from the bus master, the microprocessor restores the DMA controller by updating a length field counter in the DMA controller to indicate that data transfer has been completed. This is shown in block 580.

In another embodiment of the present invention, the bus master obtains address, length, and direction information by monitoring write cycles to specific channels in the DMA controller instead of having the information programmed by a microprocesser. In another embodiment of the present invention, the microprocessor moves data between the peripheral and main memory without the assistance of a bus master. The microprocessor utilizes slave registers in the peripheral that are I/O mapped or memory mapped.

The emulation circuitry and the emulation device driver of the present invention permits peripherals on buses that do not support DMA to support software developed for ISA-based peripherals which perform DMA. The present invention provides DMA capability without requiring changes to be made on the non-ISA buses or in the software run by the peripheral. This invention, for example, allows a PCI-based peripheral to use software developed for ISA-based peripherals.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, an apparatus and method for coordinating DMA between memory and a peripheral is disclosed.

What is claimed is:

1. A peripheral, comprising:
    a first and second internal module, wherein the first internal module is a DMA coordinator;
    a first output line, coupled to the first internal module, that transmits a DMA request signal asserted by the fast internal module;
    a second output line, coupled to the second internal module, that transmits an interrupt signal asserted by the second internal module;
    an interrupt output circuit, coupled to the first output line and the second output line, that outputs a single interrupt signal on a shared interrupt output line to a microprocessor when the DMA request signal or the interrupt signal is asserted; and
    an interrupt recording unit, coupled to the first output line and the second output line, that records which of the first and second internal module is an initiator of the single interrupt signal.

2. The peripheral of claim 1, wherein the microprocessor coordinates data transfer between the peripheral and a memory.

3. The peripheral of claim 1 further comprising a bus master that generates addresses in memory to be accessed by the peripheral.

4. The peripheral of claim 3, wherein the microprocessor programs the bus master with addresses in memory to be accessed by the peripheral.

5. The peripheral of claim 3, wherein the bus master monitors a channel in a DMA controller for addresses in memory to be accessed.

6. The peripheral of claim 1, wherein said interrupt output circuit is an OR gate.

7. A computer system, comprising:
    a memory comprising a plurality of buffers that store data;
    a microprocessor coupled to the memory;
    a memory controller that bridges the memory and the microprocessor to a bus;
    a peripheral device, coupled to the bus, comprising a first and second internal module, wherein the first internal module is a DMA coordinator, a first output line, coupled to the first internal module, that transmit a DMA request signal asserted by the first internal module, a second output line, coupled to the second internal module, that transmit a interrupt signal asserted by the second internal module, an interrupt output circuit, coupled to the first output line and the second output line, that outputs a single interrupt signal on a shared interrupt output line to a microprocessor when the DMA request signal or the interrupt signal is asserted, and an interrupt recording unit, coupled to the first output line and the second output line, that records which of the first and second internal module is an initiator of the single interrupt signal.

8. The computer system of claim 7, wherein the microprocessor coordinates data transfer between the peripheral and the memory.

9. The computer system of claim 7 further comprising a bus master that generates addresses in memory to be accessed.

10. The computer system of claim 9, wherein the microprocessor programs the bus master with addresses in memory to be accessed by the peripheral.

11. The computer system of claim 9, wherein the bus master monitors a channel of a DMA controller for addresses in the memory to be accessed.

12. The computer system of claim 7, wherein said interrupt output circuit is an OR gate.

13. A method for managing interrupt signals in a microprocessor, comprising:

determining a source of an interrupt signal;

programming and starting a bus master if the source of the interrupt signal is a DMA coordinator module;

restoring a DMA controller if the source of the interrupt signal is a bus master; and beginning an interrupt service murine if the interrupt comes from a source other than the DMA coordinator module or a bus master.

14. The method of claim 13, wherein determining a source of the interrupt signal is achieved by reading an interrupt recording unit in a peripheral.

15. The method of claim 13, wherein programming the bus master is achieved by writing memory addresses of buffers that are to be accessed in registers in the bus master.

16. The method of claim 13, wherein restoring the DMA controller is achieved by updating a length field counter in the DMA controller to indicate a data transfer.

17. A circuit for managing interrupt signals, comprising:

a interrupt source determinator that determines a source of an interrupt;

a interrupt service routine initiator that starts an interrupt serve routine in memory when the source of the interrupt is not a DMA coordinator module;

a bus master programmer, coupled to the interrupt service routine initiator, that sends memory addresses of buffers that are to be accessed by a peripheral to a bus master; and a DMA controller restorer, coupled to the bus master programmer, that updates a length field counter in a DMA controller to indicate a completed data transfer.

18. The circuit of claim 17, wherein said interrupt source determinator further comprises a circuit for reading an interrupt recording unit in a peripheral.

19. The circuit of claim 17, wherein said bus master programmer further comprises a circuit for reading registers in a DMA controller to retrieve memory address of buffers that are to be accessed by the peripheral.

* * * * *

UNITED STATES PATENT AND TRADEMARK OFFICE
CERTIFICATE OF CORRECTION

PATENT NO. : 5,708,815
DATED : January 13, 1998
INVENTOR(S) : Poisner

It is certified that error appears in the above-identified patent and that said Letters Patent is hereby corrected as shown below:

Column 9,
Line 10, delete "murine" and insert -- routine --.

Signed and Sealed this

Fourteenth Day of December, 2004

JON W. DUDAS
*Director of the United States Patent and Trademark Office*